United States Patent
Gomez

(10) Patent No.: US 11,618,153 B1
(45) Date of Patent: Apr. 4, 2023

(54) PANEL MARKING DEVICE

(71) Applicant: Ernest Gomez, Brownsville, TX (US)

(72) Inventor: Ernest Gomez, Brownsville, TX (US)

( * ) Notice: Subject to any disclaimer, the term of this patent is extended or adjusted under 35 U.S.C. 154(b) by 0 days.

(21) Appl. No.: 17/552,918

(22) Filed: Dec. 16, 2021

(51) Int. Cl.
  *G01B 3/56* (2006.01)
  *B25H 7/04* (2006.01)
  *B25H 7/02* (2006.01)

(52) U.S. Cl.
  CPC ............... *B25H 7/04* (2013.01); *B25H 7/02* (2013.01); *G01B 3/563* (2013.01)

(58) Field of Classification Search
  CPC ............ B25H 7/04; B25H 7/02; G01B 3/563
  See application file for complete search history.

(56) References Cited

U.S. PATENT DOCUMENTS

| | | | |
|---|---|---|---|
| 3,197,872 A | 8/1965 | Johnson | |
| 3,959,885 A * | 6/1976 | Edmiston | A01K 91/08 43/25 |
| 6,082,014 A * | 7/2000 | Beyers | B44D 3/38 33/413 |
| 6,345,448 B1 * | 2/2002 | Chontos | G01C 15/10 33/339 |
| 6,725,555 B1 | 4/2004 | Moore | |
| 7,051,446 B2 | 5/2006 | Moss | |
| 7,475,580 B1 * | 1/2009 | Page | B21D 7/14 72/459 |
| 7,513,053 B1 * | 4/2009 | Sidebottom, Jr. | B44D 3/38 33/408 |
| 7,513,054 B2 * | 4/2009 | Moss | E04D 15/00 33/640 |
| 7,730,626 B2 * | 6/2010 | Charpentier | E04G 21/1825 33/518 |
| 8,567,079 B2 * | 10/2013 | Cerwin | B43L 13/002 33/1 G |
| 9,701,155 B2 * | 7/2017 | Henderson | B44D 3/38 |
| 9,802,441 B2 * | 10/2017 | Douglas | B44D 3/38 |

FOREIGN PATENT DOCUMENTS

CA 2863219 8/2013

* cited by examiner

Primary Examiner — Yaritza Guadalupe-McCall

(57) ABSTRACT

A panel marking device for marking angular cut lines on panels includes a plate, which has a straight end. An L-bracket is engaged to and extends along the straight end. Cutouts in the L-bracket distal define teeth, which engage an edge of a panel so that the plate is prevented from sliding along the edge. A dial comprising a pointer is rotationally engaged to an upper face of the plate. A fastener is engaged to the dial and is opposingly positioned on a circumference of the dial relative to the pointer. Indicia are positioned on the plate, with each indicium corresponding to a respective angle of an imaginary line, which extend from a string line engaged to the fastener through the pointer, relative to the edge of the panel. The string line can be snapped to place a linear mark on the panel that matches the respective angle.

12 Claims, 4 Drawing Sheets

PANEL MARKING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to marking devices and more particularly pertains to a new marking device for marking angular cut lines on panels. The present invention discloses a marking device having teeth to achieve a firm hold on an edge of a panel, a dial for setting an angle, and an eyelet to engage a string line to allow for precision marking of the angle on a panel.

(2) Description of Related Art Including Information Disclosed Under 37 CFR 1.97 and 1.98

The prior art relates to marking devices. Prior art marking devices may comprise adjustable squares and protractors. What is lacking in the prior art is a marking device having teeth to achieve a firm hold on an edge of a panel, a dial for setting an angle, and an eyelet to engage a string line to allow for precision marking of the angle on a panel.

BRIEF SUMMARY OF THE INVENTION

An embodiment of the disclosure meets the needs presented above by generally comprising a plate, which has a straight end. An L-bracket is engaged to and extends along the straight end. A first section of the L-bracket is substantially perpendicular to the plate and a second section of the L-bracket extends codirectionally with the plate from the first section. A plurality of cutouts extends into the second section distal from the first section and defines a plurality of teeth. The teeth are configured to engage an edge of a panel so that the plate is prevented from sliding along the edge.

A dial comprising a pointer is rotationally engaged to an upper face of the plate. A fastener is engaged to the dial and is opposingly positioned on a circumference of the dial relative to the pointer. The fastener is configured to selectively engage a terminus of a string line so that the string line is removably engaged to the dial. Indicia are positioned on the plate, with each indicium corresponding to a respective angle of an imaginary line, which extends along the string line and through the pointer, relative to the edge of the panel. The fastener is configured to secure the string line so that the string line can be snapped to place a linear mark on the panel that matches the respective angle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
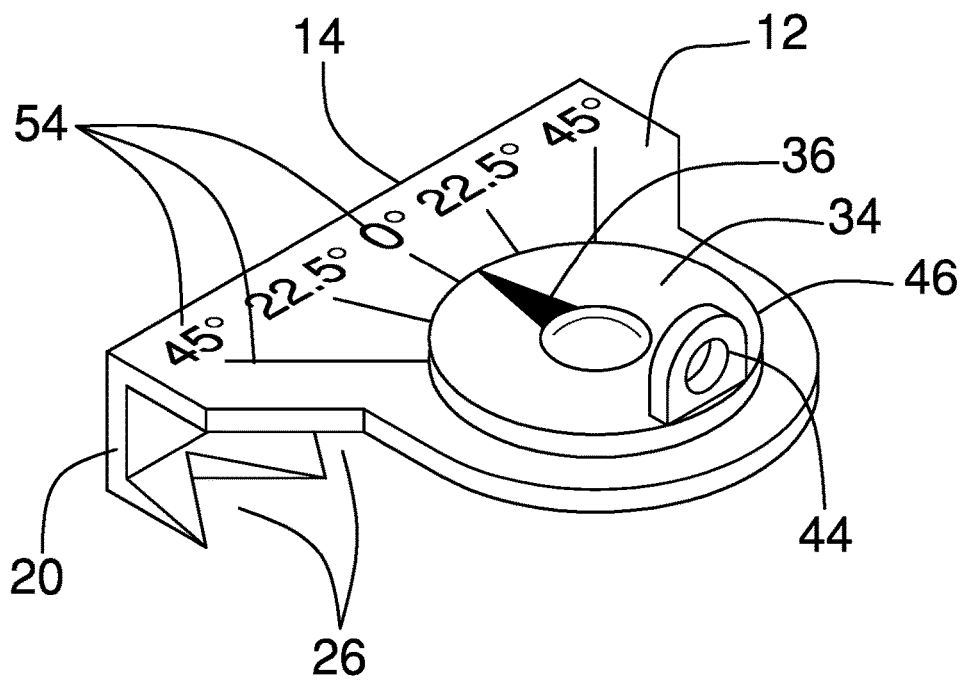
FIG. 1 is a top isometric perspective view of a panel marking device according to an embodiment of the disclosure.
Figure 2:
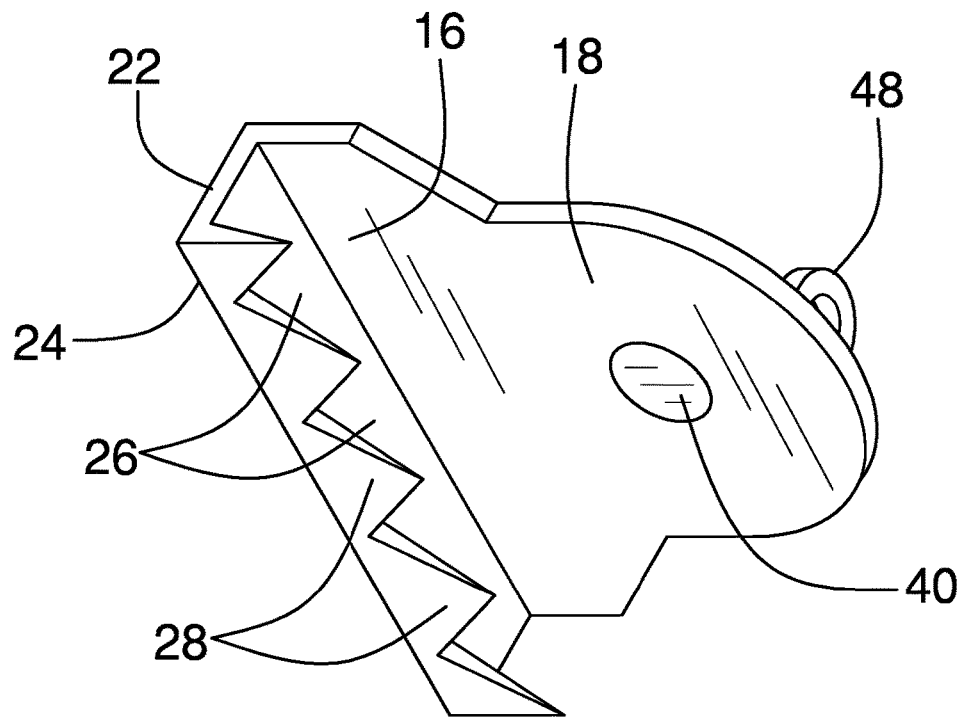
FIG. 2 is a bottom isometric perspective view of an embodiment of the disclosure.
Figure 4:
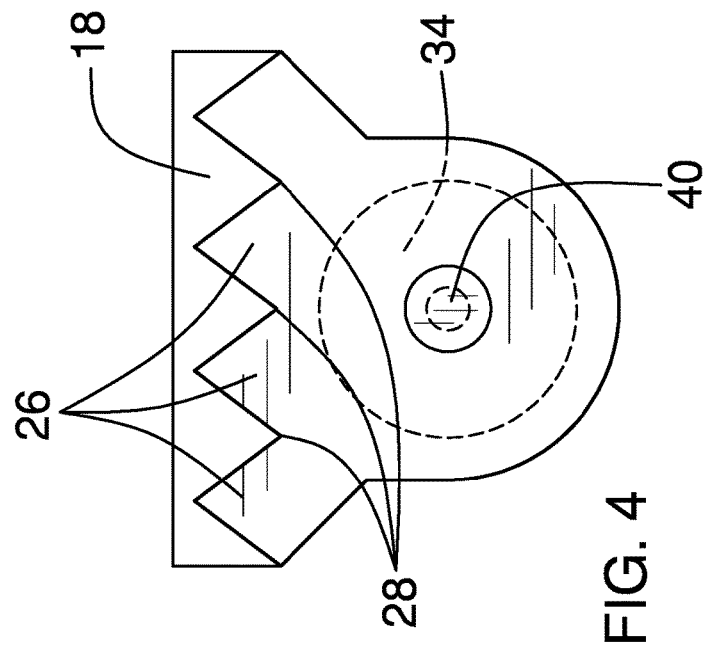
FIG. 4 is a bottom view of an embodiment of the disclosure.

With reference now to the drawings, and in particular to FIGS. 1 through 7 thereof, a new marking device embodying the principles and concepts of an embodiment of the disclosure and generally designated by the reference numeral 10 will be described.

As best illustrated in FIGS. 1 through 7, the panel marking device 10 generally comprises a plate 12, which has a straight end 14. A first portion 16 of the plate 12, which extends from the straight edge 30, is substantially rectangular. A second portion 18 of the plate 12, which extends from the first portion 16, is arcuate.

Figure 6:
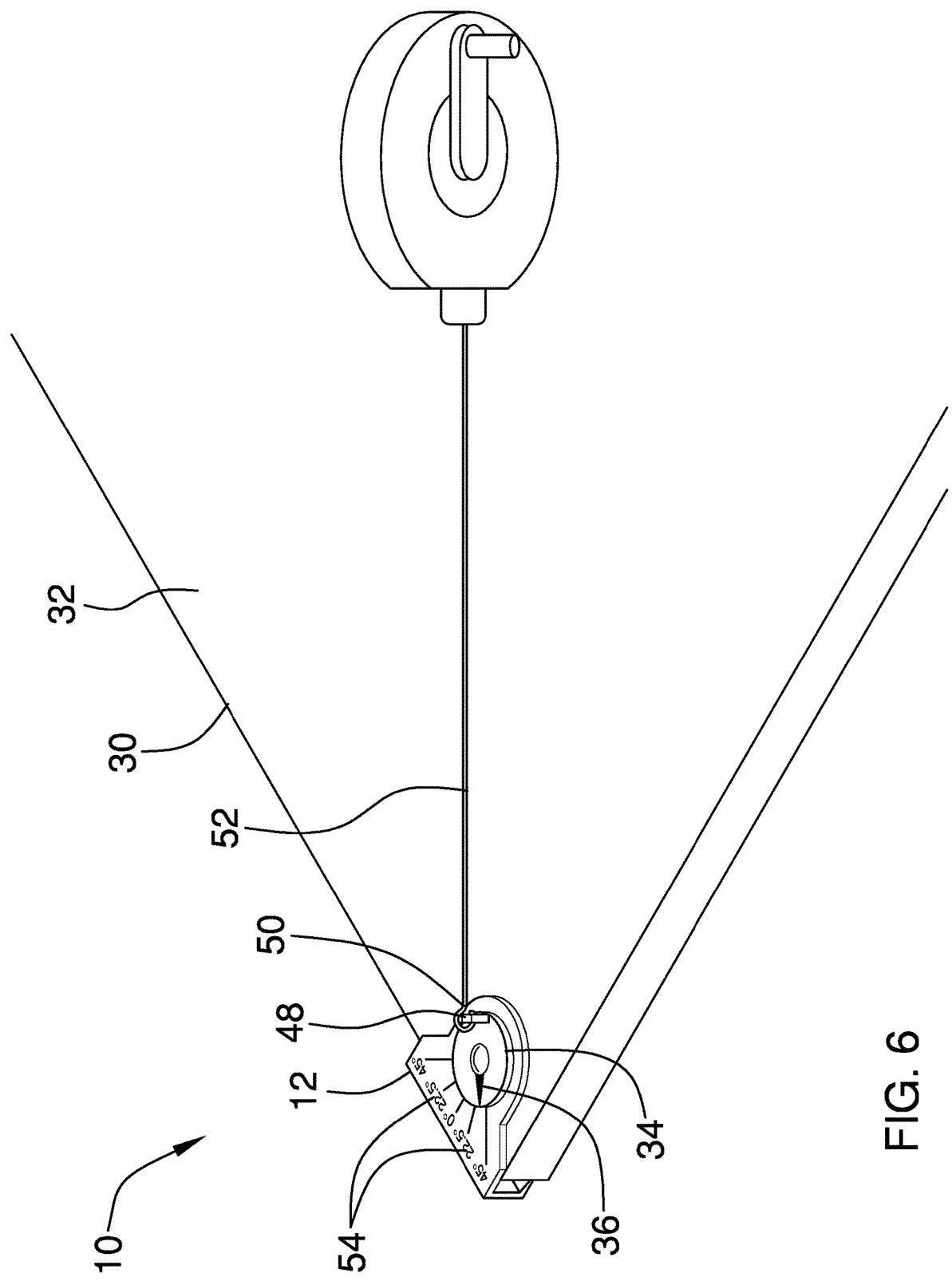
FIG. 6 is an in-use view of an embodiment of the disclosure.
Figure 7:
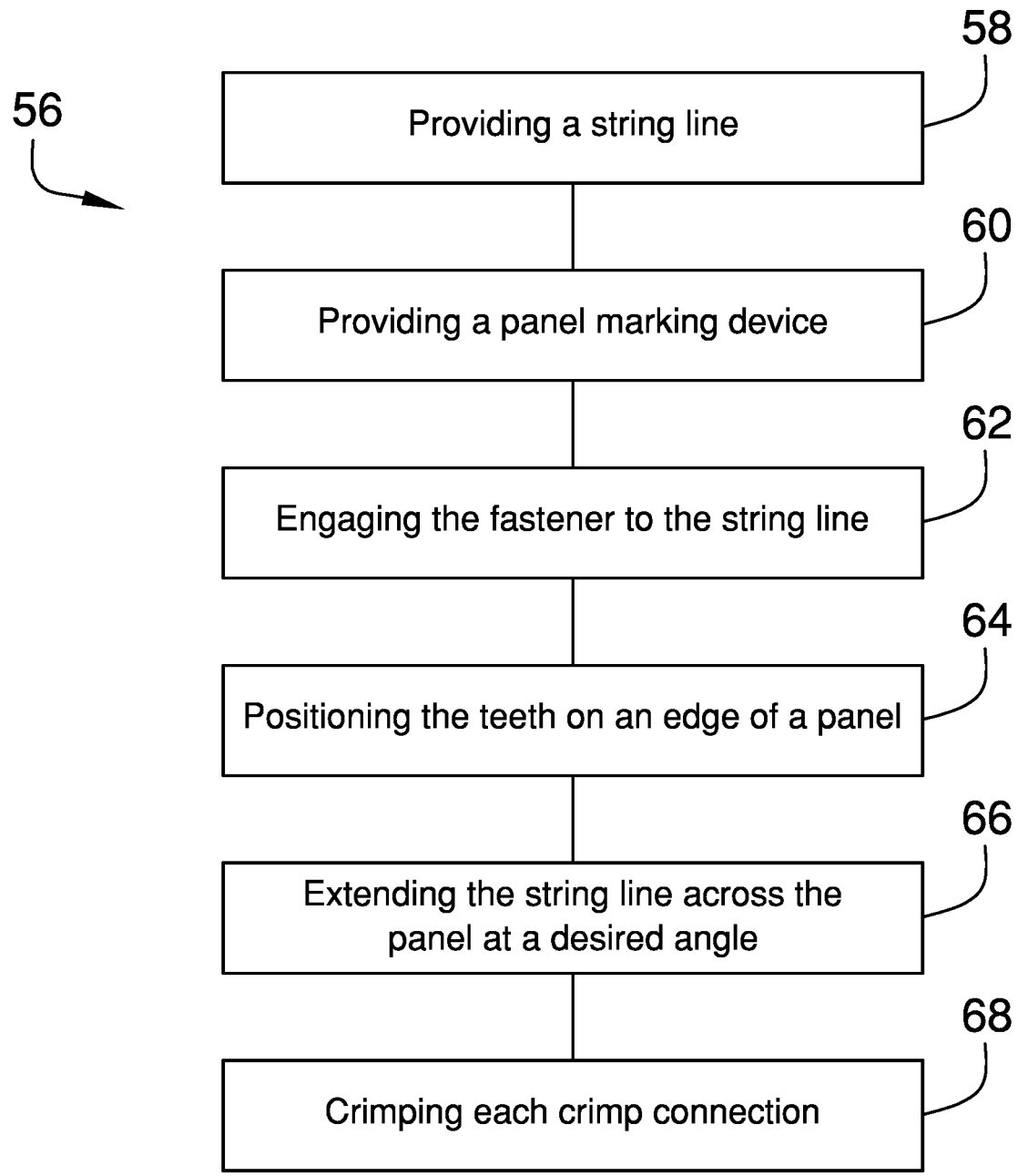
FIG. 7 is a flow diagram for a method utilizing an embodiment of the disclosure.

An L-bracket 20 is engaged to and extends along the straight end 14. A first section 22 of the L-bracket 20 is substantially perpendicular to the plate 12 and a second section 24 of the L-bracket 20 extends codirectionally with the plate 12 from the first section 22. A plurality of cutouts 26 extends into the second section 24 distal from the first section 22 and defines a plurality of teeth 28. The teeth 28 are configured to engage an edge 30 of a panel 32 so that the plate 12 is prevented from sliding along the edge 30, as shown in FIG. 6.

Figure 5:
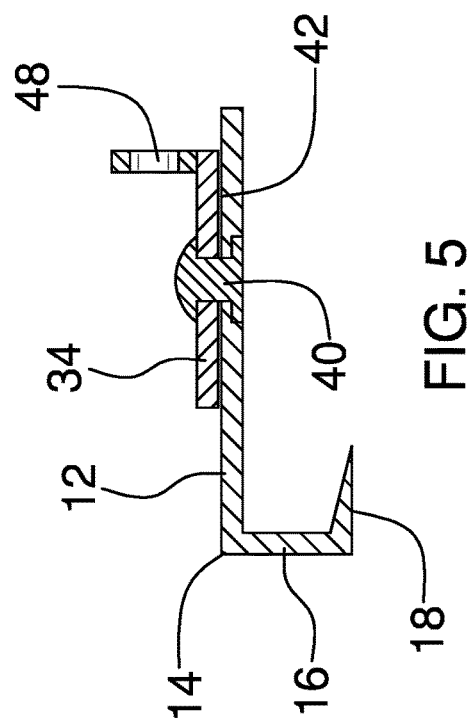
FIG. 5 is a cross-sectional view of an embodiment of the disclosure.

A dial 34 comprising a pointer 36 is rotationally engaged to an upper face 38 of the plate 12. The dial 34 is engaged to the second portion 18 of the plate 12. A pin 40 is axially engaged to the dial 34 and extends from a lower face 42 of the dial 34, as shown in FIG. 5. The pin 40 is rotationally engaged to the plate 12 so that the dial 34 is rotatable relative to the plate 12.

Figure 3:
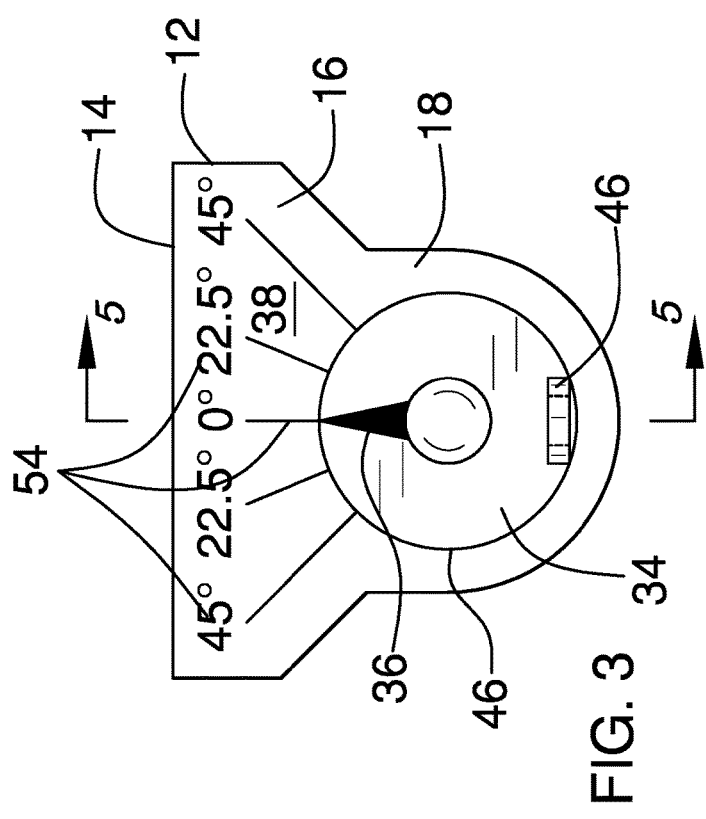
FIG. 3 is a top view of an embodiment of the disclosure.

A fastener 44 is engaged to the dial 34 and is opposingly positioned on a circumference 46 of the dial 34 relative to the pointer 36, as shown in FIG. 3. The fastener 44 may comprise an eyelet 48, or other fastening means, such as, but not limited to, hooks, clips, and the like. The fastener 44 is configured to selectively engage a terminus 50 of a string line 52 so that the string line 52 is removably engaged to the dial 34, as shown in FIG. 6.

Indicia 54 are positioned on the plate 12, as shown in FIG. 3. Each indicium 54 corresponds to a respective angle of an imaginary line, which extends along the string line 52 and through the pointer 36, relative to the edge 30 of the panel 32. The fastener 44 is configured to secure the string line 52 so that the string line 52 can be snapped to place a linear mark on the panel 32 that matches the respective angle. The indicia 54 may indicate angles of 0.0°, 22.5°, and 45.0°, although the present invention anticipates the indicia 54 indicating a variety of additional angles, such as, but not limited to, 33.3°, 60°, 72°, and the like.

In use, the panel marking device 10 enables a method 56 of marking a panel 32 for cutting. Examples of a panel 32 include, but are not limited to, drywall, particle board, metal sheet, and the like. A first step 58 of the method 56 is providing a string line 52. A second step 60 of the method 56 is providing a panel marking device 10 according to the specification above. A third step 62 of the method 56 is engaging the fastener 44 to a terminus 50 of the string line 52. A fourth step 64 of the method 56 is positioning the teeth 28 on an edge 30 of a panel 32, such that the plate 12 is prevented from sliding along the edge 30. A fifth step 66 of the method 56 is extending the string line 52 across the panel 32 at a desired angle. A sixth step 68 of the method 56 is snapping the string line 52 to place a linear mark on the panel 32 matching the desired angle. A user then is positioned to cut the panel 32 along the linear mark.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A panel marking device comprising:
   a plate having a straight end;
   an L-bracket engaged to and extending along the straight end, such that a first section of the L-bracket is substantially perpendicular to the plate and a second section of the L-bracket extends codirectionally with the plate from the first section;
   a plurality of cutouts extending into the second section distal from the first section defining a plurality of teeth, wherein the teeth are configured for engaging an edge of a panel, such that the plate is prevented from sliding along the edge;
   a dial rotationally engaged to an upper face of the plate, the dial comprising a pointer;
   a fastener engaged to the dial and being opposingly positioned on a circumference of the dial relative to the pointer, the fastener being configured for selectively engaging a terminus of a string line, such that the string line is removably engaged to the dial; and
   indicia positioned on the plate, each indicium corresponding to a respective angle of an imaginary line extending along the string line and through the pointer relative to the edge of the panel, wherein the fastener is configured for securing the string line such that the string line can be snapped placing a linear mark on the panel matching the respective angle.

2. The panel marking device of claim 1, wherein:
   a first portion of the plate extending from the straight edge is substantially rectangular;
   a second portion of the plate extending from the first portion is arcuate; and
   the dial is engaged to the second portion of the plate.

3. The panel marking device of claim 1, further including a pin axially engaged to the dial and extending from a lower face of the dial, the pin being rotationally engaged to the plate.

4. The panel marking device of claim 1, wherein the fastener comprises an eyelet.

5. The panel marking device of claim 1, wherein the indicia indicate angles of 0.0°, 22.5°, and 45.0°.

6. The panel marking device of claim 1, further including:
   a first portion of the plate extending from the straight edge being substantially rectangular;
   a second portion of the plate extending from the first portion being arcuate;
   a pin axially engaged to the dial and extending from a lower face of the dial, the pin being rotationally engaged to the second portion of the plate;
   the fastener comprising an eyelet; and
   the indicia indicating angles of 0.0°, 22.5°, and 45.0°.

7. A panel marking system comprising:
   a panel having an edge;
   a string line;
   a plate having a straight end;
   an L-bracket engaged to and extending along the straight end, such that a first section of the L-bracket is substantially perpendicular to the plate and a second section of the L-bracket extends codirectionally with the plate from the first section;
   a plurality of cutouts extending into the second section distal from the first section defining a plurality of teeth, the teeth being engaged to the edge of the panel, such that the plate is prevented from sliding along the edge;

a dial rotationally engaged to an upper face of the plate, the dial comprising a pointer;

a fastener engaged to the dial and being opposingly positioned on a circumference of the dial relative to the pointer, a terminus of a string line being engaged to and extending from the fastener; and indicia positioned on the plate, each indicium corresponding to a respective angle of an imaginary line extending along the string line and through the pointer relative to the edge of the panel, wherein the string line is configured to be snapped for placing a linear mark on the panel matching the respective angle.

8. The panel marking system of claim 7, wherein:

a first portion of the plate extending from the straight edge is substantially rectangular;

a second portion of the plate extending from the first portion is arcuate; and the dial is engaged to the second portion of the plate.

9. The panel marking system of claim 7, further including a pin axially engaged to the dial and extending from a lower face of the dial, the pin being rotationally engaged to the plate.

10. The panel marking system of claim 7, wherein the fastener comprises an eyelet.

11. The panel marking system of claim 7, wherein the indicia indicate angles of 0.0°, 22.5°, and 45.0°.

12. A panel marking method, the method comprising the steps of:

providing a string line;

providing a panel marking device comprising:
   a plate having a straight end,
   an L-bracket engaged to and extending along the straight end, such that a first section of the L-bracket is substantially perpendicular to the plate and a second section of the L-bracket extends codirectionally with the plate from the first section,
   a plurality of cutouts extending into the second section distal from the first section defining a plurality of teeth,
   a dial rotationally engaged to an upper face of the plate, the dial comprising a pointer,
   a fastener engaged to the dial and being opposingly positioned on a circumference of the dial relative to the pointer, and
   indicia positioned on the plate, each indicium corresponding to a respective angle of an imaginary line extending along the string line and through the pointer relative to the edge of the panel;

engaging the fastener to a terminus of the string line;

positioning the teeth on an edge of a panel, such that the plate is prevented from sliding along the edge;

extending the string line across the panel at a desired angle;

snapping the string line to place a linear mark on the panel matching the desired angle.

* * * * *